Figure 1:
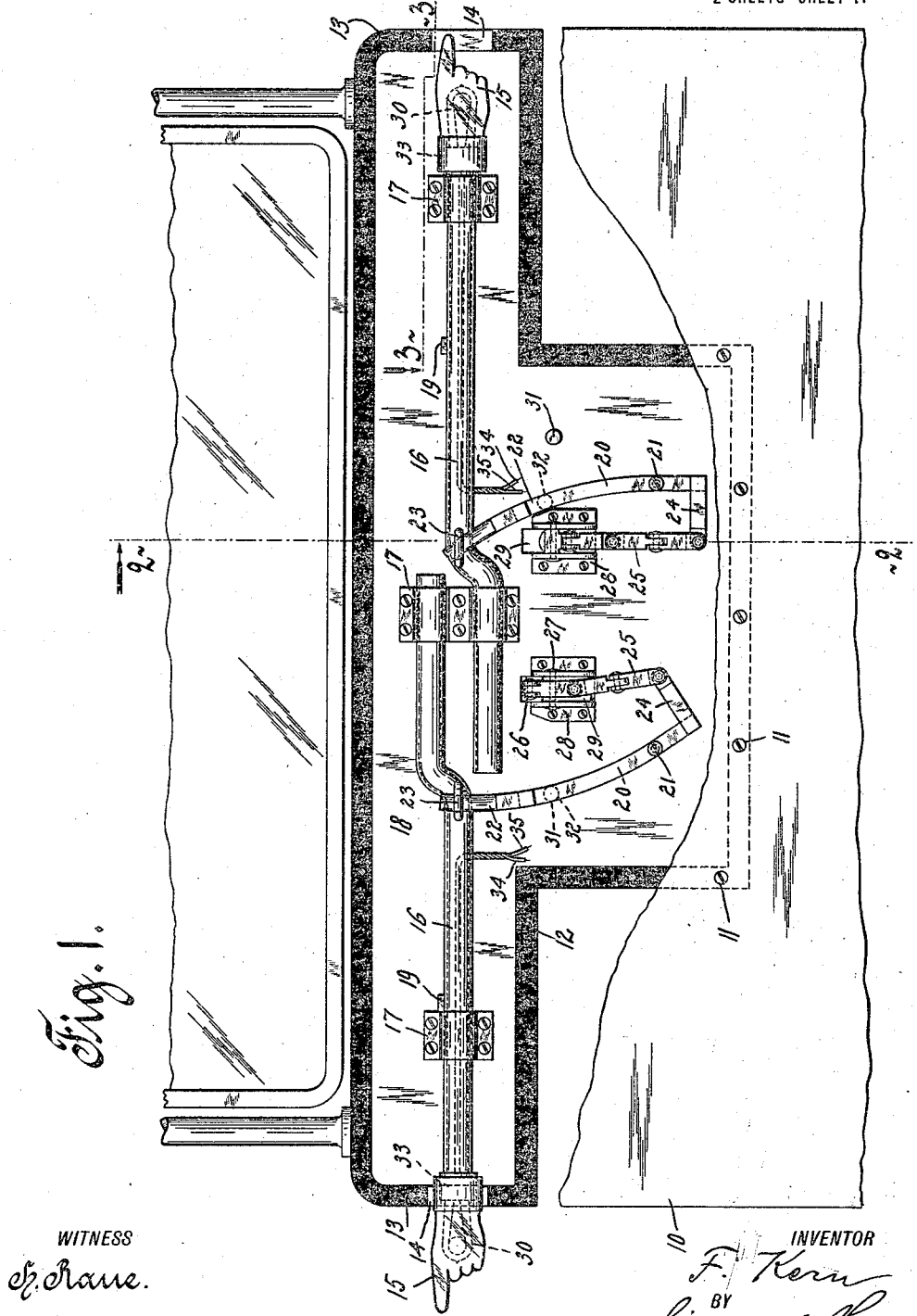

F. KERN.
VEHICLE SIGNAL.
APPLICATION FILED OCT. 25, 1915.

1,279,550.

Patented Sept. 24, 1918.
2 SHEETS—SHEET 1.

WITNESS

INVENTOR
F. Kern
BY
his ATTORNEY

F. KERN.
VEHICLE SIGNAL.
APPLICATION FILED OCT. 25, 1915.
1,279,550.
Patented Sept. 24, 1918.
2 SHEETS—SHEET 2.
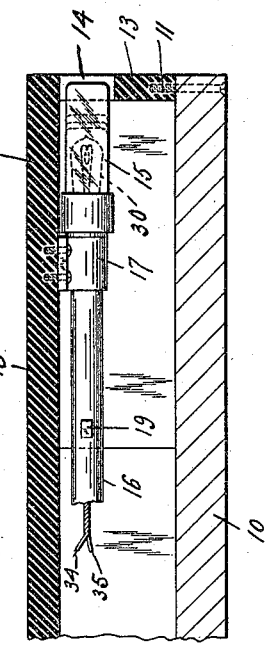
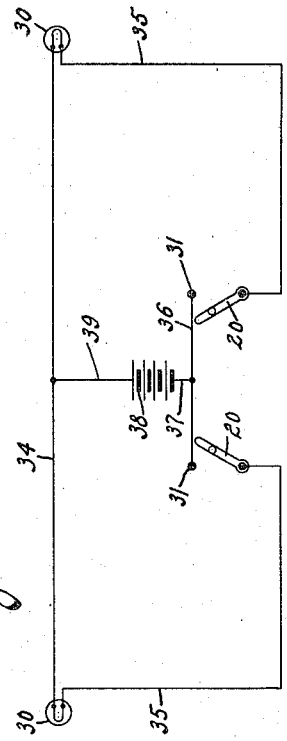
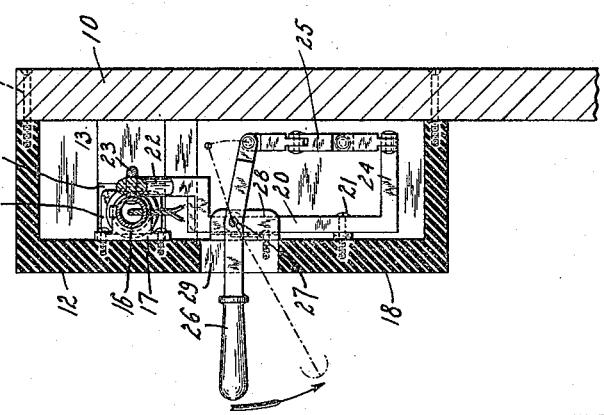
WITNESS
INVENTOR
F. Kern
BY
his ATTORNEY

UNITED STATES PATENT OFFICE.

FRANK KERN, OF NEW YORK, N. Y.

VEHICLE-SIGNAL.

1,279,550.                    Specification of Letters Patent.    Patented Sept. 24, 1918.

Application filed October 25, 1915.   Serial No. 57,786.

*To all whom it may concern:*

Be it known that I, FRANK KERN, a citizen of the United States, and a resident of the city of New York, in the county of New York and State of New York, have invented certain new and useful Improvements in Vehicle-Signals, of which the following is a specification.

The present invention relates to visual signaling devices for automobiles and other vehicles.

It is usual for the driver of an automobile or other vehicle, when he intends to slacken speed or to stop, to raise his hand as an indication to vehicles behind of what he is going to do. In practice it has been found, however, that this method of signaling is often ineffective for the reason that many drivers use the same signal when they intend to turn to the right or to the left. This method of signaling is, on the other hand, impracticable in rainy or foggy weather and also at night.

The main object of the present invention is to provide a simple and efficient signal, visible either by day or night, whereby the driver of an automobile, or of any other kind of carriage or vehicle, is enabled to warn the driver of an automobile or other vehicle approaching from the rear that his vehicle is about to stop or to make a turn to the right or to the left, thereby effectively preventing collision between his vehicle and the one behind.

With these and other objects in view, which will more fully appear as the nature of the invention is better understood, the same consists in the combination, arrangement and construction of parts hereinafter fully described, pointed out in the appended claims and illustrated in the accompanying drawings, it being understood that many changes may be made in the size and proportion of the several parts and details of construction within the scope of the appended claims without departing from the spirit or sacrificing any of the advantages of the invention.

One of the many possible embodiments of the invention is illustrated in the accompanying drawings, in which:—

Figure 1 is a front elevation of a portion of a dash-board of an automobile with the signal apparatus mounted thereon, part of the dash-board being broken away to clearly show the interior construction; Fig. 2 is a section taken on line 2—2 of Fig. 1; Fig. 3 is a section taken on line 3—3 of Fig. 1; and Fig. 4 is a diagram of the electric circuits connected with the signaling system.

In the drawings, the invention is disclosed in connection with an automobile, but it will be readily understood that it may be used with any kind of vehicles.

Referring now to the drawings, the numeral 10 indicates the dash-board of an automobile, to the rear face of the same being attached in any suitable manner, for instance by screws 11, a casing 12, that extends, preferably, throughout the width of said dash-board, and serves to contain and conceal the signaling mechanism. In the side walls 13 of this casing, which run parallel to the vertical edges of the dash-board, are formed apertures 14, one in each side wall. The means by which the visible indication is afforded comprises two members 15, which may be shaped in any convenient manner, for instance they may have, as illustrated, the form of conventional pointing hands. These hands may be made of any suitable translucent or transparent material, are hollow and rigidly attached each to a slidable, horizontal bar 16, said bars being, preferably, tubular for a purpose hereinafter to be described. The bars are each slidably mounted in bearings 17, the latter being carried by the front wall 18 of the casing. The hands 15 are disposed in such relation to the apertures 14, that, upon shifting the bars 16, they are projected through the said apertures, extending thereby beyond the vertical edges of the dash-board, as will appear hereinafter. Each bar carries a stop 19, coacting with one of the bearings 17 and serving to limit the outward movement of the bar. With the bars 16 coöperate bellcrank levers 20, the latter being pivoted at 21, to the wall 18 of the casing, their arms 22 engaging eyes 23, formed upon the bars 16, and their arms 24 being each connected by a plurality of links 25 with actuating levers 26. These levers are fulcrumed at 27 to lugs 28, formed upon the inner face of the wall 18 of the casing, and project through openings 29 therein. In Fig. 2 and on the right-hand side of Fig. 1 one of the levers 26 is shown in its normal position, in which the corresponding hand 15 is concealed from view. When an actuating lever 26 is shifted so that its longitudinal axis occupies the position shown in dotted lines in Fig. 2, the corresponding hand 15 is projected through the respective aperture 14 in the casing, thereby occupying the position shown on the left-hand side of Fig. 1 of the drawings.

Within each hand 15 is disposed an incandescent lamp 30, which, when lighted, renders the hand conspicuous. These lamps are inserted into electric circuits (Fig. 4), with each lamp being associated a switch or circuit closer. The switch of each lamp comprises a stationary contact point 31, mounted upon the inner face of the wall 18 of the casing, and a movable contact point 32. These movable contact points are carried by the bellcrank levers 20, which are made of electric conducting material, as they form, as will hereinafter appear, part of the circuits. The lamps 30 are each inserted into a socket 33. One of the terminals of a socket is connected with the corresponding terminal of the other socket by a conductor 34, and the other terminal of each socket being connected by a conductor 35 with the corresponding bellcrank lever 20. The stationary contact points 31 are interconnected by a conductor 36, from which leads a conductor 37 to one of the terminals of a battery 38, from the other terminal thereof leading a conductor 39 to the conductor 34, all as clearly shown in Fig. 4 of the drawings. Parts of the conductors 34 and 35 lead through the tubular, shiftable bars 16, as illustrated in Fig. 1 of the drawings, although they may be arranged otherwise.

The operation of this device is as follows: Normally the hands 15 are disposed within the casing 12, or in other words in the position which the hand 15 on the right-hand side of Fig. 1 of the drawings occupies. When in such positions, the electric circuits are interrupted, as the stationary contact points 31 are out of contact with the bellcrank circuit closers 20. Now, should the chauffeur of the automobile desire to notify an approaching machine that he is going to turn to one or to the other direction, he depresses the corresponding lever 26, whereby the corresponding hand 15 is projected beyond the respective vertical edge of the dashboard. At the same time the respective switch lever 20 closes the corresponding electric circuit, thereby illuminating the signal hand, which has been shifted in the manner above described. To indicate that the vehicle is about to stop or slack down, the driver depreses both levers 26, thus projecting and illuminating both hands 15.

The levers 26 should be arranged as near to each other as the structure will allow, to permit the simultaneous operation thereof by one hand of the chauffeur. In this manner the chauffeur can always keep one hand on the steering wheel and with the other one actuate the two signals either independently or simultaneously.

What I claim is:—

1. In a signal for vehicles, the combination with a horizontally disposed longitudinally shiftable bar, of a signaling member rigidly attached thereto, an actuating lever, means operatively connecting said lever with said bar, said last named means including a bellcrank lever, an electric lamp on said signaling member, and an electric circuit in which said lamp is inserted and of which said bellcrank lever forms the circuit closer.

2. In a signal for vehicles, the combination with a horizontally disposed longitudinally shiftable bar, of a signaling member rigidly attached thereto, an actuating lever, a bellcrank lever engaging said bar, means connecting said bellcrank lever and said actuating lever, an electric lamp on said signaling member, and an electric circuit in which said lamp is inserted and of which said bellcrank lever forms the circuit closer.

3. In a signal for vehicles, the combination with a horizontally disposed longitudinally shiftable bar, of a signaling member rigidly attached thereto, an actuating lever, means operatively connecting said lever with said bar, said last named means including a bellcrank lever, an electric lamp on said signaling member, and an electric circuit in which said lamp and a movable and a stationary contact point are inserted, said movable contact point being carried by said bellcrank lever.

4. In a signal for vehicles, the combination with a horizontally disposed longitudinally shiftable bar, of a signaling member rigidly attached thereto, an actuating lever, a bellcrank lever engaging said bar, means connecting said bellcrank lever and said actuating lever, an electric lamp on said signaling member, and an electric circuit in which said lamp and a movable and a stationary contact point are inserted, said movable contact point being carried by said bellcrank lever.

Signed at New York, in the county of New York, and State of New York, this 22nd day of Oct., A. D. 1915.

FRANK KERN.

Copies of this patent may be obtained for five cents each, by addressing the "Commissioner of Patents, Washington, D. C."